Sept. 3, 1940.  J. M. WILKINS  2,213,790
REPLACEABLE SEAT ON DIAPHRAGM-OPERATED RELIEF VALVES
Filed May 12, 1938
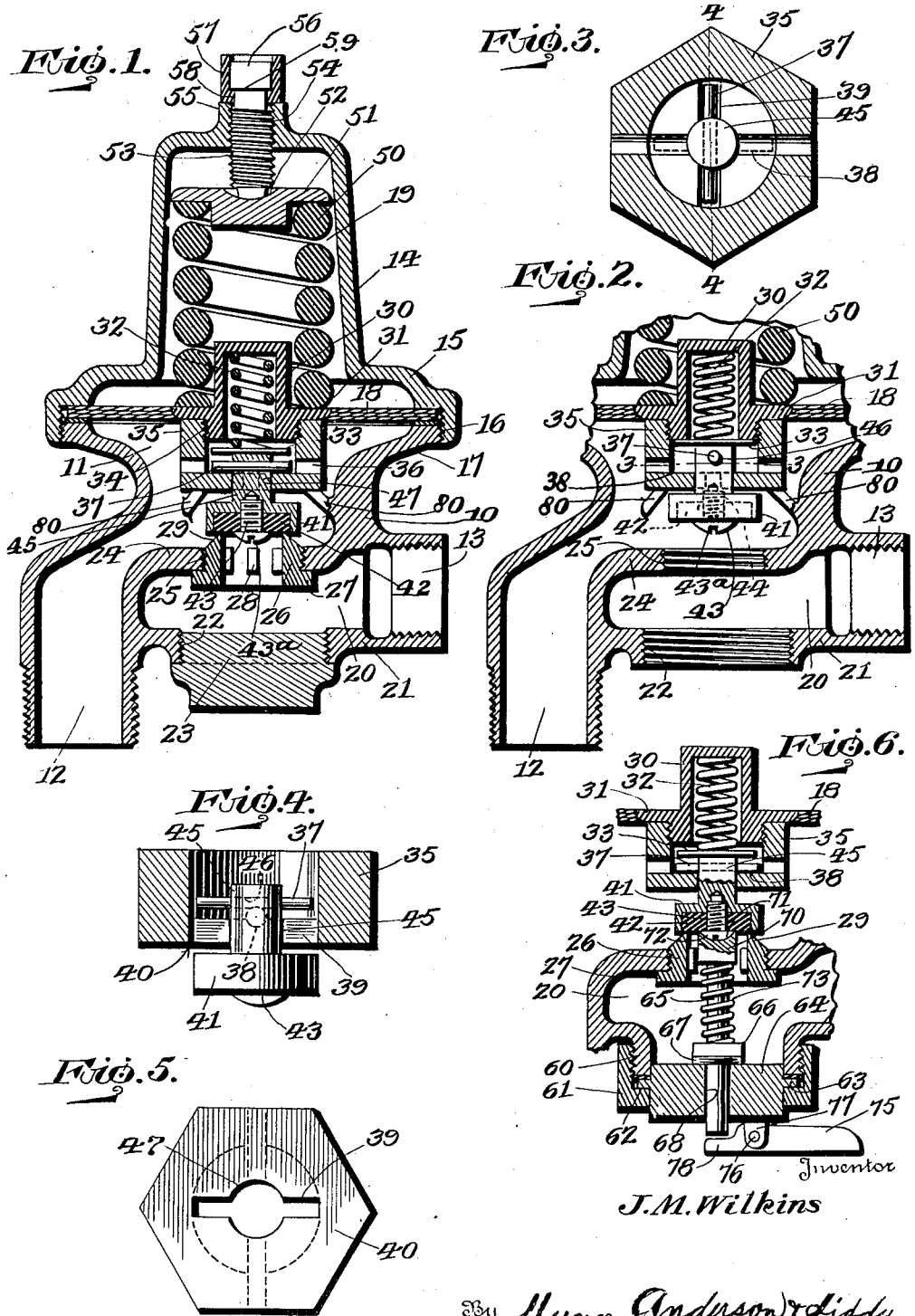
Inventor
J. M. Wilkins
By Munn, Anderson & Liddy
Attorneys Patented Sept. 3, 1940

2,213,790

UNITED STATES PATENT OFFICE 2,213,790

REPLACEABLE SEAT ON DIAPHRAGM-OPERATED RELIEF VALVES

James M. Wilkins, Morrisonville, Ill.

Application May 12, 1938, Serial No. 207,634

1 Claim. (Cl. 137—53)

This invention relates to automatic valves and is more particularly directed to a replaceable seat on diaphragm-operated relief valves.

An object of the invention is the provision of a valve construction in which a valve is automatically operated in accordance with internal pressures within the valve body, the valve per se being readily removable for the replacement of washers without necessitating the disassembling of the structure.

A further object of the invention is the provision of an automatically operated valve which may be tested manually and which has a valve readily removable per se without necessitating the disassembling of the valve construction so that by the removal of a plug said valve and its supporting means may be withdrawn from the valve body without requiring the removal of a diaphragm operating the valve in accordance with internal pressures within the valve body.

This invention will be best understood from a consideration of the following detailed description, in view of the accompanying drawing forming a part of the specification; nevertheless, it is to be understood that the invention is not confined to the disclosure, being susceptible of such changes and modifications as define no material departure from the salient features of the invention as expressed in the appended claim.

In the drawing:

Figure 1 is a vertical section of a valve construction,

Figure 2 is a fragmentary vertical section showing the valve at approximately 90° from the position shown in Fig. 1, Figure 3 is a vertical section taken along the line 3—3 of Fig. 2, Figure 4 is a vertical section taken along the line 4—4 of Fig. 3, Figure 5 is a bottom plan view of the valve holder with the valve removed, and Figure 6 shows a modified form of the construction having an external means for testing the operation of the valve.

Referring more particularly to the drawing, 10 designates a valve body having a pressure chamber 11, an inlet pipe 12 and an outlet pipe 13.

A cap 14 has an enlargement at 15 and this enlargement is threaded at 16 on an extension 17 of the body 10 for not only closing the top of the valve body but for clamping a diaphragm 18 in position so that the pressure chamber 11 is sealed from a spring chamber 19 in the cap 14.

The valve body also contains an outlet chamber 20 which is in communication with the outlet nipple 13. This nipple is internally threaded to receive a pipe connection for carrying fluid away from the valve body.

The bottom portion 21 of the outlet chamber is provided with an opening and the walls of this opening are threaded, as shown at 22, to receive a removable plug 23.

A partition 24 separates the pressure chamber 11 from the outlet chamber 20. The partition is provided with a threaded opening 25 into which is screwed a valve seat 26.

The valve seat is in the form of a sleeve having a lower flange 27 adapted to engage the underface of the partition 24 for sealing the partition against the loss of fluid between the chambers 11 and 20 at the threaded opening 25. The internal face of the sleeve 26 is provided with lugs 28 which are adapted to be engaged by a screw driver or other suitable instrument for screwing the sleeve in place or for removing the same. The upper end of the sleeve is provided with a valve seat 29.

A cup-shaped member 30 has a flange 31 which is embedded in the diaphragm 18 and connected thereto in any approved manner. The member 30 forms a housing for a spring 32 which has its upper end in engagement with the inner wall of the cup-shaped member while the opposite end of the spring rests upon a disc 33. The cup-shaped member below the flange 31 is threaded at 34 and is screwed into a valve holder 35. This valve holder or support is in the shape of a cap nut which is screwed up tight against the bottom face of the flange 31 carried by the diaphragm 18. A diametrical passage 36 is so drilled in the nut that it will form a semi-circular groove 38 in which the pin 37 is seated at times, as shown in Figs. 2 and 4. A slot 39 is formed in the bottom 40 of the nut 35 and is of sufficient length so that the pin 37 may pass through the slot as will be presently explained.

A valve 41 which is cup-shaped receives a washer 42 and this washer is held in place by means of a screw 43 which is threaded into a central passage 44 formed in the member 41. A boss or extension 45 projects from the center of the cup-shaped member 41 and is provided with a diametrically-disposed passage 46 to receive the pin 37. The pin 37 is driven through the passage 46 in the boss 45 before the boss 45 is received within a central passage 47 in the bottom 40 of the nut 35. When the boss is inserted into position the projecting ends of the pin are passed through the slot 39 after which the valve is turned so that the pin will fall into the seat 38. However, when the valve 41 is closed the pin 37 is held slightly above the groove 38. A spring 50 is located within the cap 14 and has its lower end resting upon the flange 31 of the spring housing 30 while the upper end is engaged by an adjusting plate 51.

This plate has a central notch 52 receiving the lower end of a bolt 53. This bolt is screwed into a threaded passage 54 in a boss 55 at the upper end of the cap 14. The outer end 56 of the bolt is adapted to be engaged by a small pipe wrench for turning and setting the bolt and for moving the plate 51 inwardly or outwardly against the spring 50 for increasing or decreasing the tension on the spring. A sleeve 57 surrounds the outer end of the bolt 53 and is provided with an internal shoulder 58 adapted to engage an external shoulder 59 on the bolt 53 so that after the bolt has been screwed into place any attempts to change the adjustment by rotating the sleeve 57 will have no effect whatever on the bolt since the sleeve may be rotated independently of the bolt.

In Fig. 6 is shown a modified form of the compression chamber 20 and this includes an externally threaded boss 60 to receive a cap nut 61 which has a shoulder 62 upon which is adapted to rest a flange 63 of a plug 64. When the nut 61 is screwed into place the plug 64 will be sealed against the loss of fluid at its periphery. A plunger 65 is mounted for reciprocation within the chamber 20 and is provided with a collar 66 for compressing a sealing washer 67 onto the inner face of the plug 64 to prevent the loss of fluid through a central passage 68 through which the lower end of the piston 65 projects.

The upper end of the piston is provided with an enlargement 70 having a seat 71 adapted to receive a head 72 of the screw 43. A spring 73 is located between the collar 66 and a shoulder on the head 70 for maintaining the member 70 against the head of the screw 43 and the collar 66 against the washer 67 so that the washer will be pressed against the inner face of the plug 64. A lever 75, which is adapted to be manually operated, is pivotally mounted at 76 upon ears 77 formed on the underface of the plug 64. The lever is provided with a finger 78 adapted to engage the projecting end of the plunger 65 so that when the lever is operated the finger 78 will force the piston 65 inwardly and move the washer 42 and likewise the member 41 away from the seat 29 of the sleeve 26.

The operation of my device is as follows: The bolt 53 is adjusted so that the spring 50 will maintain the proper pressure on the diaphragm 18 whereby when fluid passes through the pressure chamber 11 it will raise the diaphragm and open the valve 42 to permit water to pass through its normal course through the outlet pipe. If for any reason pressure in the chamber 11 is decreased the diaphragm 18 will be lowered and therefore close the valve 42 until sufficient pressure is built up in the chamber 11 to again operate the diaphragm 18.

When the washer 42 wears sufficiently and it is necessary to replace said washer the mechanic will remove the plug 23 and the sleeve 26. By employing the screw driver engaging the slot 43a in the screw 43 and turning it through an angle of 90° either to the right or to the left, the pin 37 will align with the slot 39 (Figs. 4 and 5) after it has been removed from the groove 38 in the bottom of the nut 35. When the alignment occurs the pin may pass through the slot and the valve 41 will pass through the threaded passage 25 and also through the threaded passage 22 whence the old washer may be removed and a new one placed therein. The parts just removed may then be returned when the valve is again in condition for proper functioning. The plug 23 and the sleeve 26 must be removed before the valve can be withdrawn.

It will be seen by this construction that it is not necessary to tear down the whole valve structure, that is by the removal of the cap 15 and the diaphragm, to reach the valve 41. These parts can be retained in position without even disturbing the seat tension on the spring 50, since the valve 41 will readily pass through the openings 25 and 22, respectively, after the pin 37 has been aligned with the slot 39 in the nut 35.

In the modified form shown in Fig. 6 it is only necessary to remove the cap nut 61 whence the entire assembly of the manual operating means for the valve 41 may be removed. After this the sleeve 26 is unscrewed and as has been previously described the valve 41 may be released by rotating it through an angle of 90°.

There is no danger of the pin 37 being positioned accidentally to fall through the slot 39 at any time during the operation of the device since the spring 32 maintains the said pin seated within the semi-circular groove 38.

Fingers 80 project upwardly from the side walls of the chamber 11. The free ends of said fingers support the valve holder 35 at all times and the spring 50 presses said holder on to the fingers.

By this construction, the valve holder is retained in a predetermined position so that when it is desired to remove valve 41, the operator is not required to make any effort to support the member 35. The valve 41 is pressed towards the seat 29 by the spring 32.

I claim:

In an automatic valve construction, a housing formed of an upper and lower section, a diaphragm clamped between the two sections, an inverted cup-shaped member carried by the diaphragm and having a threaded portion depending from said diaphragm, the lower section having threaded inlet and outlet connections for rigidly securing the body to fluid conducting pipes, a valve having a stem removably suspended from the diaphragm, a partition dividing the lower section into a lower and an upper chamber, a removable valve seat below the valve, said seat being threadedly mounted in the partition and projecting into the upper chamber, a hollow nut screwed on to the threaded portion of the cup-shaped member and suspending the valve above the valve seat and provided with a diametrical opening in the lower portion thereof, a pin mounted diametrically of the nut and normally supported by the bottom of the nut along a line which is at a right angle to the opening, and means within the nut and cup-shaped member for urging the valve towards its seat, said lower section having a closeable opening through which the valve seat and valve may be withdrawn when released from their respective connections.

JAMES M. WILKINS.